(12) United States Patent
Rose

(10) Patent No.: US 9,618,152 B2
(45) Date of Patent: Apr. 11, 2017

(54) ADJUSTMENT DEVICE FOR A SUPPORT ARM SYSTEM

(71) Applicant: ROLEC Gehäuse-Systeme GmbH, Rinteln/Weser (DE)

(72) Inventor: Friedhelm Rose, Porta Westfalica (DE)

(73) Assignee: ROLEC Gehäuse-Systeme GmbH, Rinteln/Weser (DE)

( * ) Notice: Subject to any disclaimer, the term of this patent is extended or adjusted under 35 U.S.C. 154(b) by 0 days.

(21) Appl. No.: 14/706,610

(22) Filed: May 7, 2015

(65) Prior Publication Data

US 2016/0010791 A1    Jan. 14, 2016

Related U.S. Application Data

(63) Continuation of application No. PCT/DE2013/100372, filed on Oct. 28, 2013.

(30) Foreign Application Priority Data

Nov. 9, 2012 (DE) .................. 10 2012 021 914

(51) Int. Cl.
  *F16M 11/06* (2006.01)
  *F16M 13/02* (2006.01)
  (Continued)

(52) U.S. Cl.
  CPC ............. *F16M 13/02* (2013.01); *F16C 11/04* (2013.01); *F16M 11/10* (2013.01);
  (Continued)

(58) Field of Classification Search
  USPC .............. 248/291.1, 292.11, 222.13, 289.11; 16/239, 241, 221; 403/91, 95, 96, 113,
  (Continued)

(56) References Cited

U.S. PATENT DOCUMENTS 2,135,145 A * 11/1938 Reed .................. B60R 1/06
  16/223
3,305,281 A * 2/1967 Dumpis .............. B62D 7/16
  280/93.508

(Continued)

FOREIGN PATENT DOCUMENTS

AT     308 213 B      6/1973
DE     202 18 691 U1  2/2003
(Continued)

OTHER PUBLICATIONS

International Search Report (ISR) of Apr. 24, 2014, in PCT/DE2013/100372 (3 pages).

*Primary Examiner* — Alfred J Wujciak

(74) *Attorney, Agent, or Firm* — Shlesinger, Arkwright & Garvey LLP

(57) ABSTRACT

Adjustment device for a support arm system, support arm system includes a support arm for holding an object, a hinge part having a receiving portion for securing the support arm, and the hinge part being rotatably mounted on a hinge retainer. Support arm is securable with an end face to the hinge part, and a deployment angle of the support arm being adjustable using adjustment device which is formed from a wedge-shaped adjustment head that interacts with a slide incline of the hinge part and the end face of the support arm. Adjustment head includes a wedge surface and a pressure surface that lies opposite wedge surface, and adjustment head is adjustable such that the wedge surface slides along on the slide incline and pressure surface therefore pressing against end face of the support arm such that the deployment angle of the support arm can be adjusted.

11 Claims, 1 Drawing Sheet

(51) Int. Cl.
*F16M 11/10* (2006.01)
*F16M 11/20* (2006.01)
*F16C 11/04* (2006.01)

(52) U.S. Cl.
CPC ..... *F16M 11/2021* (2013.01); *F16M 11/2064* (2013.01); *F16M 11/06* (2013.01); *F16M 2200/065* (2013.01)

(58) Field of Classification Search
USPC .................................. 403/119, 150, 164, 165
See application file for complete search history.

(56) References Cited

U.S. PATENT DOCUMENTS

| | | | | |
|---|---|---|---|---|
| 4,290,168 | A | * | 9/1981 | Binge ................. E05D 11/1007 16/271 |
| 5,209,215 | A | * | 5/1993 | Morrison .................. F41B 5/12 124/22 |
| 5,607,249 | A | * | 3/1997 | Maughan ................. B62D 7/16 403/120 |
| 2004/0104327 | A1 | | 6/2004 | Frick ...................... A61B 19/26 248/415 |
| 2007/0241531 | A1 | | 10/2007 | D'Alusio et al. |

FOREIGN PATENT DOCUMENTS

| | | |
|---|---|---|
| DE | 10 2008 057 816 B3 | 4/2010 |
| EP | 1 041 335 B1 | 4/2005 |
| FR | 2 899 868 A1 | 10/2007 |

\* cited by examiner

ADJUSTMENT DEVICE FOR A SUPPORT ARM SYSTEM

CROSS REFERENCE TO RELATED APPLICATIONS

This application claims the priority of International Application No. PCT/DE2013/100372, filed 28 Oct. 2013, which claims the priority of German Patent Application No. 10 2012 021 914.8, filed 9 Nov. 2012, and each of which is incorporated herein by reference.

FIELD OF THE INVENTION

The invention relates to an adjustment device for a support arm system for levelling a support arm.

BACKGROUND OF THE INVENTION

Support arm systems are provided to swivel-mount an object, e.g., a housing, at a wall or a fixed element. Hereby, the support arm system comprises at least one hinge and a support arm affixed thereto, the hinge being commonly constructed as a wall hinge, attachment hinge at a wall mount or intermediate hinge between two support arms. In systems of this type the housing is affixed to the support arm and can thus be adjusted, depending on the particular construction of the hinge, in its horizontal and/or vertical position.

In the event that very heavy objects are affixed to the support arm the support arm, previously horizontally oriented, may possibly decline downwards as a result of the load. Thus, the support arm required readjustment. To that end, usually, adjusting screws are disposed at the interface between the hinge and the support arm by means of which the inclination of the support arm may be adjusted, thereby levelling the support arm.

Such a support arm system is disclosed in EP 1 041 335 B1, whereby the support arm is affixed to a hinge part of the hinge by means of fastening screws. In addition, an adjustment screw is provided acting directly on an end face of the support arm facing the hinge or on the hinge part, so that the inclination of the support arm is adjusted by adjusting the adjustment screw.

A disadvantage of that solution is that the adjustment acts on the hinge in a merely punctiform manner and that the material upon which the adjustment screw acts is compromised by rotation of the screw so that the support arm may be subject to wear. Moreover, owing to the merely punctiform support, the support arm may laterally tilt in the event of high loads.

Another adjustment device for a support arm system of this type has been proposed in the publication DE 10 2008 057 816 B3. Hereby, a support arm is mounted on a hinge part whereby at least one adjustment screw is disposed between the support arm and the hinge part the screw being screwed into a screw channel disposed lengthwise in relation to the support arm. Furthermore, the screw head of the adjustment screw rests against a support part of the hinge part so that, when the adjustment screw is rotated, the screw head presses against the support part thereby tilting the end face of the support arm against the end face of the hinge part thereby enabling adjustment of the deployment angle of the support arm.

A disadvantage of this solution is that the adjustment screws are disposed in a direction lengthwise in relation to the support arm so that it is very difficult to adjust the adjustment screws, e.g. at a wall hinge, for lack of operating space because the adjustment screws are facing the wall.

OBJECTS AND SUMMARY OF THE INVENTION

An object of the invention to create an adjustment device for a support arm system allowing secure, reliable and simple levelling of a support arm.

This object is achieved by an adjustment device for a support arm system according to the invention. Advantageous and functional further developments are described herein.

Thus, according to the invention, an adjustment device for a support arm system for levelling a support arm is provided whereby the adjustment system is provided with a wedge-shaped adjustment head interacting with the support arm and a hinge part. Hereby, the hinge part is rotatably mounted on a hinge retainer, e.g. a wall mounting, together forming a hinge whereby the hinge is designed preferably as a wall hinge or an attachment hinge or an intermediate hinge.

In that manner, the support arm and the adjustment head are disposed at the hinge part in such a way that the adjustment head lies between an end face of the support arm and a slide incline of the hinge part whereby, according to the invention, a wedge surface of the adjustment head interacts with the slide incline and a convex pressure surface of the adjustment head lying opposite the slide incline interacts with a lower region of the end surface. Hereby, the adjustment head is adjustable whereby the wedge surface, depending on the vertical position of the adjustment head, slides along the slide incline in such a way that the pressure surface of the adjustment head pushes the lower region of the end face of the support arm away from the hinge part.

In that manner, an upper region of the end surface of the support arm remains in contact with the hinge so that a pivot point is created here around which the support arm pivots by pushing away the lower region. Hereby, according to the invention, a deployment angle of the support arm can be adjusted so that the support arm may be levelled under load by vertically readjusting the adjustment head accordingly. Preferably, the support arm is fixed in this levelled position by fastening screws.

The lower region in which the adjustment head presses against the end face of the support arm hereby covers at least one third of the width of the support arm. This bears the advantage that the adjustment head interacts not only in a punctiform manner by with a larger region of the support arm so that in the event of a load the weight is distributed over a larger region.

Preferably, the adjustment head is further adjustable by means of an adjustment screw which is screwed into a screw channel at the hinge part. Hereby, the screw channel runs along a vertical direction. Thus, the adjustment screw is also adjustable in the vertical direction, vertically pushing the adjustment head upwards.

This results in the advantage that the deployment angle can be adjusted by a mechanic from an advantageous working position whereby the adjustment screw, e.g. in the case of a wall mounting, can be operated easily by means of a tool. Moreover, the fastening screws are disposed outside the operating region of the adjustment screw so that adjustment of both screws is made easy.

Relative terms such as up, down, left, and right are for convenience only and are not intended to be limiting.

Subsequently, the invention is further illustrated by means of an example embodiment and accompanying drawings. Therein is shown:

DETAILED DESCRIPTION OF THE INVENTION

Figure 1:
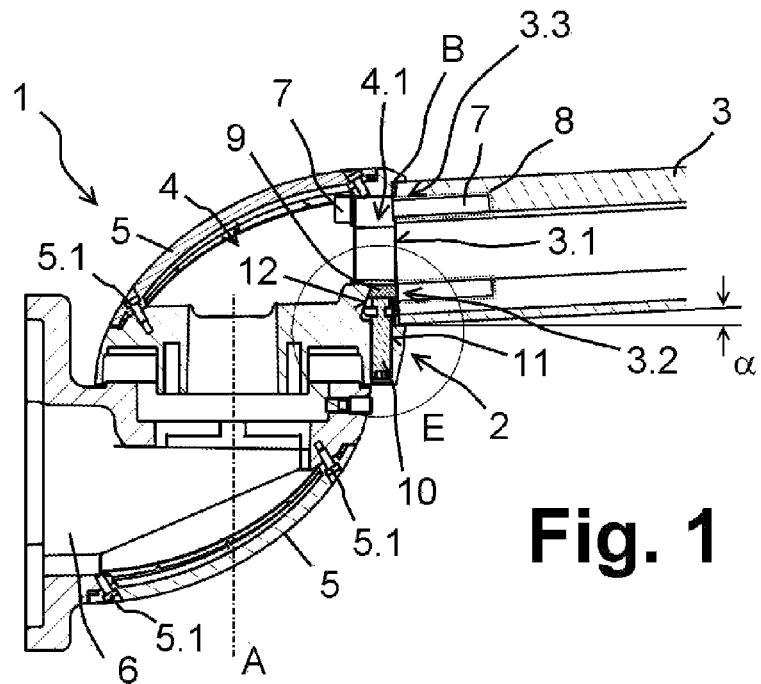
FIG. 1 is a sectional view of a support arm with an adjustment device.

The embodiment shown relates to a support arm system 1 with an adjustment device 2, the support arm system 1 being provided with a support arm 3, attached to which is usually an object, e.g. a housing, a hinge part 4 with a receiving portion 4.1 and a hinge retainer 6 designed as a wall mounting. Furthermore, the hinge part 4 and the wall mounting 6 are provided with covers 5 offering protection from exterior influences, the covers 5 being mounted by means of screws 5.1.

As can be seen in FIG. 1 the hinge part 4 is mounted on the wall mounting 6 so that the hinge part 4 can be rotated around the hinge axis A thereby generating a wall hinge. In the following, the support arm system 1 is described merely on the example of a wall hinge. However, the invention is in no way limited to a wall hinge and can be utilized easily by means of an intermediate hinge or an attachment hinge.

The support arm 3 is mounted on the receiving portion 4.1 of the hinge part 4 by means of fastening screws 7. Hereby, the fastening screws 7 run through the receiving portion 4.1 and are screwed into screw channels 8 running lengthwise inside the support arm 3. Hereby, the support arm 3 is firmly affixed to the hinge part 4 and rotatable, together with this, around the hinge axis A in a horizontal plane.

Figure 2:
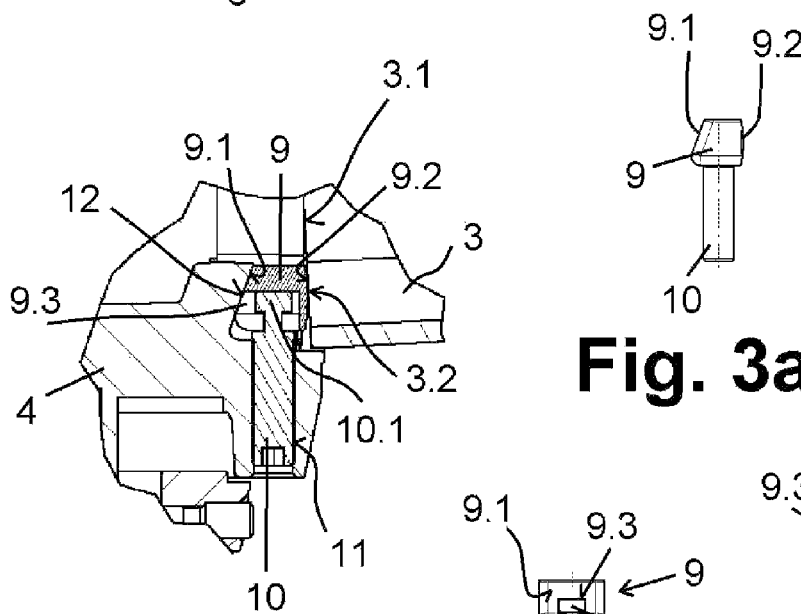
FIG. 2 is a detail of the adjustment device according to detail E of FIG. 1 on an enlarged scale.

Furthermore, according to FIG. 1 and the detail view in FIG. 2, an adjustment head 9 and an adjustment screw 10 are disposed at the hinge part 4, the adjustment head 9 being screwed into a vertically extending screw channel 11 of the hinge part 4. Hereby, the adjustment screw 10 may be e.g. a hexagon socket screw operated from below by means of a hex-wrench. The adjustment head 9 exhibits a wedge surface 9.1 and a convex pressure surface 9.2 disposed opposite the wedge surface 9.1, the wedge surface 9.1 resting against a slide incline 12 of the hinge part 4 and the pressure surface 9.2 resting against a lower region 3.2 of an end face 3.1 of the support arm 3.

In that manner, the adjustment head 9 causes a distance to be adjustable between the lower region 3.2 of the end face 3.1 of the support arm 3 and the hinge part 4 whereby the upper region 3.3 of the end face 3.1 remains in contact with the hinge part 4 thereby creating a pivot point B. When the adjustment head 9 is vertically moved upwards by turning the adjustment screw 10 the adjustment head 9 slides along the slide incline 12 thereby also acting in the direction of the support arm 3. Hereby, the pressure surface 9.2 is pressed against the end face 3.1 of the support arm 3 and the support arm 3 pivots about the pivot point B and a deployment angle α along a vertical axis is set. Thus, the further the adjustment head 9 is moved upwards the further the support arm 3 is adjusted about the pivot point B. Consequently, the loaded support arm 3 can be levelled in that the adjustment head 9 is turned appropriately.

Figures 3A, 3B, 3C:
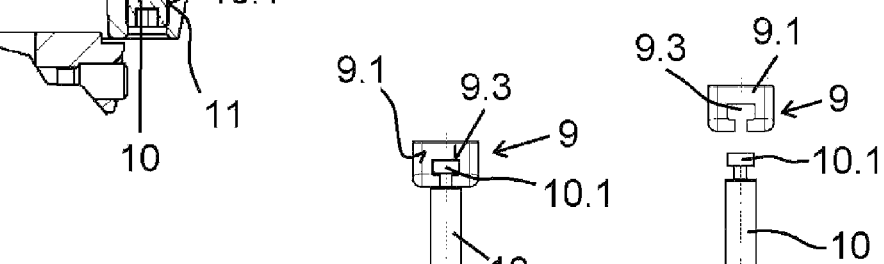
FIG. 3a is a side view of an adjustment head and an adjustment screw of the embodiment of FIG. 1.
FIG. 3b is a side view of an adjustment head and an adjustment screw of the embodiment of FIG. 1; and, FIG. 3c is a side view of an adjustment head and an adjustment screw of the embodiment of FIG. 1.

For guiding the adjustment head 9 on the adjustment screw 10 a screw head 10.1 of the adjustment screw 10 is movably mounted in a channel 9.3 of the adjustment head 9, as can be seen in FIGS. 2 and 3c. Hereby, the channel 9.3 extends in the direction of the end face 3.1 of the support arm 3 so that the adjustment head 9 may be moved, depending on the adjustment of the adjustment screw 10, along the channel 9.3 either in the direction towards the support arm 3 or away from the support arm 3.

Furthermore, thanks to the channel 9.3 the adjustment head 9 is held at the hinge part 4, e.g. in the event the support arm 3 is removed or mounted, so that it cannot fall off. Moreover, when assembling the support arm system 1, the adjustment head 9 may simply be slid onto the screw head 10.1 of the adjustment screw 10 already screwed into the screw channel 11 in the hinge part 4 thereby minimising assembly time.

Thus, for assembling the support arm system 1, firstly, the support arm 3 is inserted into the receiving portion 4.1 of the hinge part 4. Then, the fastening screws 7 in the lower region 3.2 and in the upper region 3.3 are screwed into the screw channels 8 of the support arm 3 designated herefor and tightened firmly so that the support arm 3 is firmly affixed to the hinge part 4. Thereafter, the object, e.g., a housing, is affixed to the end of the support arm 3. If the support arm 3 slightly tilts downwards through the load the fastening screws 7 in the upper region 3.3 are loosened only slightly and the fastening screws 7 in the lower region 3.2 are loosened so far that it is possible to push the lower region 3.2 of the end face 3.1 of the support arm 3 away from the hinge part 4. Now, the adjustment screw 10 is turned in the screw channel 11 until the desired deployment angle of the support arm 3 is set. Subsequently, all fastening screws 7 are tightened firmly so that the support arm 3 is fixed at its accordingly adjusted deployment angle thereby being oriented preferably horizontally. A new levelling procedure may be carried out accordingly.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Adjustment device for a support arm system, the support arm system including a support arm for supporting an object; a hinge part having a receiving portion for securing the support arm; the hinge part being rotatably mounted on a hinge retainer for rotation in a horizontal plane, and the support arm being able to be secured with an end face to the hinge part, and a deployment angle of the support arm along a vertical axis being adjustable using the adjustment device, the adjustment device comprising:
   a) a wedge-shaped adjustment head that interacts with a slide incline of the hinge part and the end face of the support arm, the adjustment head including a wedge surface as well as a pressure surface that lies opposite the wedge surface; and,
   b) the adjustment head being adjustable such that the wedge surface slides along the slide incline and the pressure surface therefore presses against the end face of the support arm in such a way that the pressure surface of the adjustment head pushes a lower region of the end face of the support arm away from the hinge part such that the deployment angle of the support arm can be adjusted.

2. Adjustment device according to claim 1, wherein:
a) an adjustment screw is provided, and the adjustment head is adjustable by the adjustment screw.

3. Adjustment device according to claim 2, wherein
a) the adjustment screw is disposed inside a screw channel extending vertically inside the hinge part.

4. Adjustment device according to claim 2, wherein:
a) a screw head of the adjustment screw is disposed inside a channel at the adjustment head for guiding the adjustment head on the adjustment screw.

5. Adjustment device according to claim 1, wherein:
a) the pressure surface is convex.

6. Adjustment device according to claim 1, wherein:
a) fastening screws are provided, and the support arm is affixed to the hinge part by the fastening screws for locking the deployment angle.

7. Adjustment device according to claim 1, wherein:
a) the hinge part forms part of one of a wall hinge, an attachment hinge, and an intermediate hinge.

8. Adjustment device for a support arm system, the support arm system including a support arm for supporting an object; a hinge part having a receiving portion for securing the support arm; the hinge part being rotatably mounted on a hinge retainer for rotation in a horizontal plane, and the support arm being able to be secured with an end face to the hinge part and a deployment angle of the support arm along a vertical axis being adjustable using the adjustment device, the adjustment device comprising:
a) a wedge-shaped adjustment head that interacts with a slide incline of the hinge part and the end face of the support arm, the adjustment head including a wedge surface as well as a pressure surface that lies opposite the wedge surface;
b) the adjustment head being adjustable such that the wedge surface slides along the slide incline and the pressure surface therefore presses against the end face of the support arm such that the deployment angle of the support arm can be adjusted;
c) an adjustment screw being provided, and the adjustment head is adjustable by the adjustment screw; and
d) a screw head of the adjustment screw being disposed inside a channel at the adjustment head for guiding the adjustment head on the adjustment screw.

9. Adjustment device according to claim 8, wherein:
a) the pressure surface is convex.

10. Adjustment device for a support arm system, the support arm system including a support arm for supporting an object; a hinge part having a receiving portion for securing the support arm; the hinge part being rotatably mounted on a hinge retainer for rotation in a horizontal plane, and the support arm being able to be secured with an end face to the hinge part and a deployment angle of the support arm along a vertical axis being adjustable using the adjustment device, the adjustment device comprising:
a) a wedge-shaped adjustment head that interacts with a slide incline of the hinge part and the end face of the support arm, the adjustment head including a wedge surface as well as a pressure surface that lies opposite the wedge surface;
b) the adjustment head being adjustable such that the wedge surface slides along the slide incline and the pressure surface therefore presses against the end face of the support arm such that the deployment angle of the support arm can be adjusted; and
c) fastening screws being provided, and the support arm being affixed to the hinge part by the fastening screws for locking the deployment angle.

11. Adjustment device according to claim 10, wherein:
a) the pressure surface is convex.

\* \* \* \* \*